(12) United States Patent
Olsen et al.

(10) Patent No.: US 7,683,774 B2
(45) Date of Patent: Mar. 23, 2010

(54) SYSTEM, METHOD, AND APPARATUS FOR CAPTURING TELEMATICS DATA WITH AN ACTIVE RFID TAG

(75) Inventors: John Olsen, Cumming, GA (US); David Bradley, Alpharetta, GA (US); Rhesa Jenkins, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 12/341,124

(22) Filed: Dec. 22, 2008

(65) Prior Publication Data

US 2009/0102638 A1 Apr. 23, 2009

Related U.S. Application Data

(63) Continuation of application No. 11/766,639, filed on Jun. 21, 2007, now Pat. No. 7,486,181.

(51) Int. Cl.
*G01C 21/00* (2006.01)
*G08B 26/00* (2006.01)
*G08B 13/14* (2006.01)

(52) U.S. Cl. ............... 340/505; 340/572.1; 701/213; 342/357.08

(58) Field of Classification Search ............ 340/541, 340/438, 426.1–426.28, 568.1–572.9, 523–526, 340/10.1, 505; 342/357.06–357.08, 357.1, 342/357.12, 357.13; 701/213–215
See application file for complete search history.

(56) References Cited

U.S. PATENT DOCUMENTS

| 5,014,206 | A | 5/1991 | Scribner et al. |
| 5,111,902 | A | 5/1992 | Sundeen et al. |
| 5,347,274 | A | 9/1994 | Hassett et al. |
| 5,444,444 | A | 8/1995 | Ross et al. |
| 5,497,149 | A | 3/1996 | Fast |

(Continued)

FOREIGN PATENT DOCUMENTS

DE 196 18 535 A1 7/1997

(Continued)

OTHER PUBLICATIONS

Office Action from U.S. Appl. No. 12/254,031 mailed Jan. 15, 2009.

(Continued)

*Primary Examiner*—Jennifer Mehmood
(74) *Attorney, Agent, or Firm*—Alston & Bird LLP

(57) ABSTRACT

Data collection and evaluation systems that, in various embodiments, include an active RFID tag for collecting, time-stamping, and storing vehicle sensor data. Examples of the type of data collected include door data, ignition data, oil pressure data, temperature data, speed data, global positioning data, and diagnostic and trouble code data. The system further includes an external data acquisition device, such as a mainframe computer system or a hand-held data acquisition device like an iPAQ. The external data acquisition device includes an RFID interrogator for communicating with the RFID tag, which enables the RFID tag to transmit the time-stamped data wirelessly to the external data acquisition device. The ability of the system to automatically collect and transfer data allows for the automation of fleet management processes, vehicle maintenance and repair processes, and certain security features.

35 Claims, 4 Drawing Sheets

U.S. PATENT DOCUMENTS

| | | | |
|---|---|---|---|
| 5,500,516 | A | 3/1996 | Durbin |
| 5,528,758 | A | 6/1996 | Yeh |
| 5,534,684 | A | 7/1996 | Danielson |
| 5,635,693 | A * | 6/1997 | Benson et al. ............ 340/10.33 |
| 5,648,770 | A | 7/1997 | Ross |
| 5,708,423 | A | 1/1998 | Ghaffari et al. |
| 5,736,725 | A | 4/1998 | Danielson |
| 5,751,245 | A * | 5/1998 | Janky et al. ............ 342/357.07 |
| 5,751,973 | A | 5/1998 | Hassett et al. |
| 5,797,134 | A | 8/1998 | McMillan et al. |
| 5,805,419 | A | 9/1998 | Hundt et al. |
| 5,808,564 | A | 9/1998 | Simms et al. |
| 5,834,749 | A | 11/1998 | Durbin |
| 5,835,377 | A | 11/1998 | Bush |
| 5,862,500 | A | 1/1999 | Goodwin |
| 5,867,382 | A | 2/1999 | McLaughlin |
| 5,919,239 | A | 7/1999 | Fraker et al. |
| 5,993,098 | A | 11/1999 | Osada |
| 6,003,773 | A | 12/1999 | Durbin et al. |
| 6,034,379 | A | 3/2000 | Bunte et al. |
| 6,064,970 | A | 5/2000 | McMillan et al. |
| 6,071,643 | A | 6/2000 | Chino et al. |
| 6,084,528 | A | 7/2000 | Beach et al. |
| 6,124,806 | A | 9/2000 | Cunningham et al. |
| 6,134,437 | A | 10/2000 | Karabinis et al. |
| 6,148,262 | A | 11/2000 | Fry |
| 6,211,781 | B1 | 4/2001 | McDonald |
| 6,246,672 | B1 | 6/2001 | Lumelsky |
| 6,249,008 | B1 | 6/2001 | Bunte et al. |
| 6,285,916 | B1 | 9/2001 | Kadaba et al. |
| 6,313,791 | B1 * | 11/2001 | Klanke ................. 342/357.17 |
| 6,408,233 | B1 | 6/2002 | Solomon et al. |
| 6,433,732 | B1 | 8/2002 | Dutta |
| 6,459,969 | B1 | 10/2002 | Bates et al. |
| 6,496,775 | B2 | 12/2002 | McDonald, Jr. et al. |
| 6,496,806 | B1 | 12/2002 | Horwitz et al. |
| 6,600,418 | B2 | 7/2003 | Francis et al. |
| 6,618,668 | B1 * | 9/2003 | Laird ......................... 701/204 |
| 6,648,770 | B1 | 11/2003 | Snyder |
| 6,664,922 | B1 * | 12/2003 | Fan .......................... 342/357.1 |
| 6,801,850 | B1 | 10/2004 | Wolfson |
| 6,819,267 | B1 | 11/2004 | Edmark |
| 6,868,386 | B1 | 3/2005 | Henderson et al. |
| 6,895,329 | B1 | 5/2005 | Wolfson |
| 7,034,683 | B2 | 4/2006 | Ghazarian |
| 7,212,122 | B2 | 5/2007 | Gloekler et al. |
| 7,358,857 | B1 * | 4/2008 | White ..................... 340/572.8 |
| 7,457,693 | B2 | 11/2008 | Olsen et al. |
| 2002/0008621 | A1 | 1/2002 | Barritz et al. |
| 2002/0024448 | A1 | 2/2002 | Olesen |
| 2002/0032517 | A1 | 3/2002 | Buckelew et al. |
| 2002/0044084 | A1 | 4/2002 | Itoh et al. |
| 2003/0083060 | A1 | 5/2003 | Menendez |
| 2003/0114206 | A1 | 6/2003 | Timothy et al. |
| 2003/0144985 | A1 | 7/2003 | Ebert |
| 2003/0163287 | A1 | 8/2003 | Vock et al. |
| 2003/0224818 | A1 | 12/2003 | Nagasaka et al. |
| 2004/0249557 | A1 | 12/2004 | Harrington et al. |
| 2006/0145837 | A1 | 7/2006 | Horton |
| 2006/0164232 | A1 | 7/2006 | Waterhouse et al. |
| 2008/0125724 | A1* | 5/2008 | Monroe ..................... 604/264 |

FOREIGN PATENT DOCUMENTS

| | | |
|---|---|---|
| EP | 0 635 800 | 1/1995 |
| EP | 1 216 901 A1 | 6/2002 |
| GB | 2 225 459 A | 5/1990 |
| GB | 2 358 427 A | 7/2001 |
| GB | 2 363 884 A | 1/2002 |
| JP | H6-333117 | 12/1994 |
| JP | 07-199861 | 8/1995 |
| JP | 2001-278414 | 10/2001 |
| WO | WO 01/91438 A1 | 11/2001 |
| WO | WO 03/014752 A1 | 2/2003 |
| WO | WO 03/081560 A1 | 10/2003 |

OTHER PUBLICATIONS

Notice of Allowance and Fees Due from U.S. Appl. No. 12/254,031 mailed Mar. 30, 2009.

Murphy, Jean V., "Yard Management Systems Extend Automation Beyond the Dock Door", SupplyChainBrain.com, Mar. 2005, Global Logistic & Supply Chain Strategies.

Partial International Search Report for PCT/US2005/000789 dated Oct. 26, 2005.

Partial International Search Report for PCT/US2005/000729 dated Oct. 26, 2005.

International Search Report and Written Opinion for PCT/US2005/000789 dated Jan. 10, 2006.

International Search Report and Written Opinion for PCT/US2005/000729 dated Jan. 10, 2006.

* cited by examiner

SYSTEM, METHOD, AND APPARATUS FOR CAPTURING TELEMATICS DATA WITH AN ACTIVE RFID TAG

CROSS-REFERENCE TO RELATED APPLICATIONS

This application is a continuation of U.S. application Ser. No. 11/766,639, filed Jun. 21, 2007, now U.S. Pat. No. 7,486,181, which is hereby incorporated herein in its entirety by reference. U.S. application Ser. No. 11/766,639 further claims the benefit of U.S. application Ser. No. 11/032,992, filed Jan. 10, 2005, which is hereby incorporated herein in its entirety by reference, and which claims priority from provisional U.S. Patent Application No. 60/535,316, filed on Jan. 9, 2004 and which is hereby incorporated by reference in its entirety.

FIELD OF INVENTION

This invention relates to real-time vehicle monitoring and tracking systems and methods. More specifically, the present invention pertains to an active RFID tag configured to acquire telematics data through multiple input interfaces and provide the acquired data to an external data terminal. The device and its method of use are useful in the field of vehicle fleet management. In one embodiment, the active RFID tag collects telematics data from sensors in the vehicle, stores the data, and communicates the data to a data terminal such as a Delivery Information Acquisition Device (DIAD), which is a portable computing device utilized by United Parcel Service to collect parcel delivery data, or an RFID interrogator.

BACKGROUND OF THE INVENTION

In vehicle fleet operations, efficient management of vehicle allocation, security, and maintenance and driver allocation and security are paramount tasks. For example, with a package delivery fleet system, delivery process elements, such as time traveled between stops, time of each stop, distance traveled, proximity to delivery point, routing of delivery points, and number of stops made per vehicle, can be analyzed to make the delivery and routing processes more efficient. Currently, for United Parcel Service (UPS), this data is manually collected. For example, a person rides in a vehicle for an entire day and uses a hand-held data acquisition device, such as, for example, Hewlett Packard's iPAQ hand-held data acquisition device, to enter data corresponding to various elements of the delivery process. This data is manually recorded by the person, entered into a database, and analyzed. This data collection process is time consuming and produces data that is often erroneous or outdated when utilized.

In addition, vehicle maintenance and repair functions are performed to ensure that vehicles are available for deployment when needed. Currently, vehicle maintenance schedules for each vehicle are maintained in a central database, and the database notifies automotive personnel to perform the scheduled maintenance function when due based on calendar driven preventive maintenance schedules. Repair diagnostic tests are performed when maintenance personnel are made aware of a need for repair. Known maintenance schedule notification and repair processes are inefficient because the maintenance personnel are not always informed of maintenance needs, and vehicle diagnostic tests can be time consuming and costly. Additionally, the potential delay in notifying maintenance personnel of a need to repair or perform maintenance procedures often renders a vehicle out of service or risks the safety of the vehicle and driver.

Furthermore, package delivery vehicle fleet operators must consider which security measures should be employed to most efficiently and effectively protect packages, vehicles, and drivers. Currently, security mechanisms are not automated and are seldom utilized. As a result, delivery drivers sometimes mistakenly leave a cargo or cab door unlocked, and the vehicle and inventory are susceptible to theft or damage.

Therefore, an unsatisfied need in the art exists for a real-time vehicle tracking and monitoring system that overcomes current challenges, some of which are described above.

BRIEF SUMMARY OF THE INVENTION

One embodiment of the present invention is directed to a system for automating the collection of vehicle sensor data for fleet operations of a parcel delivery service. The system includes an active RFID tag and a portable data acquisition device accessible to a vehicle operator. The RFID tag includes an input interface for collecting data from one or more sensors that are disposed within a vehicle, a processor for associating a time-stamp with at least a portion of the data, and a memory for storing the time-stamped data. The data includes a current global position of the vehicle. The portable data acquisition device includes an RFID interrogator for receiving the data from the memory of the RFID tag, a memory for storing the data, and a data acquisition processor. The memory of the portable data acquisition device stores one or more pre-selected delivery positions, and the data acquisition processor compares the current global position to the pre-selected delivery positions. In one embodiment, the portable data acquisition device alerts the vehicle operator of the nearest delivery position to the current global position. In another embodiment, the portable data acquisition device provides an estimated time of arrival to each of the one or more pre-selected delivery positions to the operator. In yet another embodiment, the portable data acquisition device alerts the operator if a parcel associated with a particular delivery position is delivered to an incorrect delivery position.

The RFID tag is capable of collecting other types of data, including the following: door data, electronic control module trouble and diagnostic codes, ignition data, mileage data, seat belt data, engine data, geographical position data, or combinations thereof.

In another embodiment, a system for automating the collection of vehicle sensor data for fleet operations of a parcel delivery service includes an active RFID tag and a portable data acquisition device, which is accessible to a vehicle operator. The RFID tag includes an input interface for collecting data from one or more sensors that are disposed within a vehicle, a processor for associating a time-stamp with at least a portion of the data, and a memory for storing the time-stamped data. The portable data acquisition device includes an RFID interrogator that receives the data from the memory of the RFID tag, a memory for storing the data, a data acquisition processor, and a data radio. The memory of the portable data acquisition device stores threshold data parameters representative of normal vehicle operation conditions. The data acquisition processor compares the data collected by the RFID tag to the data parameters in the memory and transmits an alarm signal via the data radio if the collected data is outside of the data parameters. In another embodiment, the data acquisition processor compares the collected data to the data parameters in the memory of the data acquisition device over a time interval.

One embodiment of the invention provides a system for automating security features of one or more vehicles in a fleet. The system includes an active RFID tag disposed within a vehicle and a portable data acquisition device accessible to the vehicle operator. The RFID tag includes an input interface for collecting data from sensors disposed within a vehicle, a processor for associating a time-stamp with the data, and a memory for storing the time-stamped data. The portable data acquisition device includes an RFID interrogator for receiving the data from the memory of the RFID tag and a data radio for communicating the data wirelessly to a mainframe computer system. When the portable data acquisition device is within a particular geographical range of the RFID tag, the RFID interrogator receives a signal indicating that the tag is within the read range of the interrogator. If the portable data acquisition device is moved so that the interrogator no longer receives a signal from the RFID tag, and this condition persists for more than a particular time interval, the portable data acquisition device is configured to transmit a signal via the data radio to a facility to report a potential security breach.

A fleet management system according to one embodiment of the invention includes an active RFID tag disposed within a vehicle and a portable data acquisition device. The RFID tag includes an input interface for collecting data from sensors disposed within a vehicle, a processor for associating a time-stamp with the data, and a memory for storing the time-stamped data. The portable data acquisition device includes an RFID interrogator for receiving data from the memory of the RFID tag and a data radio. If the portable data acquisition device detects a security triggering event from the data collected by the RFID tag, the portable data acquisition device is configured to transmit a signal to a remote external data acquisition device at a facility via the data radio. In one embodiment, the portable data acquisition device, which is accessible to a vehicle operator, is configured to page a facility in response to receiving data from the RFID tag that indicates a security triggering event.

One embodiment of the invention provides a system for managing traffic and equipment within a fleet facility hub. The system includes an active RFID tag disposed within a vehicle and an external data acquisition device. The RFID tag includes an input interface for collecting data from sensors disposed within a vehicle, a processor for associating a time-stamp with the data, and a memory for storing the time-stamped data. The external data acquisition device includes an RFID interrogator that receives data from the memory of the RFID tag and from other RFID tags disposed on cargo within the vehicle and a data radio for communicating over a wireless network. The RFID interrogator can receive data from the RFID tag when the RFID interrogator is within a particular geographical range of the RFID tag. The data transmitted to the external data acquisition device can be used to allocate equipment at the facility, determine where in the facility the vehicle should park, and determine whether the vehicle is allowed to enter or exit a facility. A facility may include a parcel sorting hub facility, a railhead facility, or a seaport facility.

One embodiment of the invention includes a system for detecting whether a vehicle is unsecured. The system includes an active RFID tag and a portable data acquisition device. The RFID tag includes an input interface for receiving data from one or more sensors disposed within a vehicle and a memory for storing the data. The data indicates whether one or more doors are locked or unlocked, whether the engine is running, and whether the vehicle is in motion. The portable data acquisition device, which includes an RFID interrogator, receives and analyzes the data. In response to the data indicating that the door is unlocked, the engine is running and the vehicle is not moving, the portable data acquisition device is configured for notifying an operator of the vehicle.

Another embodiment of the invention includes a system for automating the collection of vehicle sensor data for fleet operations of a parcel delivery service. The system includes an active RFID tag and an external data acquisition device. The RFID tag includes an input interface for collecting data from one or more sensors that are disposed within a vehicle, a processor for associating a time-stamp with at least a portion of the collected data, and a memory for storing the time-stamped data. The external data acquisition device, which is located at a facility, includes an RFID interrogator for receiving data from the RFID tag and a memory for storing data received from the RFID tag. The data and an identity of the vehicle indicated by the RFID tag are uploaded to the RFID interrogator upon the vehicle's entry into or exit from the facility.

One embodiment of the invention includes a method of collecting work study data for evaluating vehicle fleet operations. The method includes the steps of: (1) providing an active RFID tag within one or more fleet vehicles, each the RFID tags configured for receiving data from one or more vehicle sensors disposed in each of the one or more vehicles; (2) collecting, time-stamping, and storing data received from the one or more vehicle sensors using the RFID tag; (3) in response to a pre-determined event, transmitting the data from the RFID tag to an RFID interrogator, wherein the RFID interrogator is in communication with an external data acquisition device; and (4) utilizing the data to perform work studies of vehicle and driver performance. In a further embodiment, the method includes the step of utilizing the data to identify and send notification of vehicle repair and maintenance needs.

Another embodiment of the invention includes a method of automating security functions for one or more vehicles in a fleet. The method includes the steps of: (1) providing an RFID tag in one or more fleet vehicles, wherein the RFID tag is configured for collecting data from one or more vehicle sensors; (2) providing a portable data acquisition device that includes an RFID interrogator for receiving data from the RFID tag when the portable data acquisition device is within a certain range of the RFID tag; and (3) sending a signal to a facility in response to the portable data acquisition device being moved from within the certain range to outside the certain range such that the RFID interrogator moves from a point where it is in communication with the RFID tag to a second point where the RFID interrogator is no longer in communication with the RFID tag for a certain pre-determine time interval.

BRIEF DESCRIPTION OF THE DRAWINGS

Reference will now be made to the accompanying drawings, which are not necessarily drawn to scale, and wherein.

DETAILED DESCRIPTION OF THE DRAWINGS

Figure 1A:
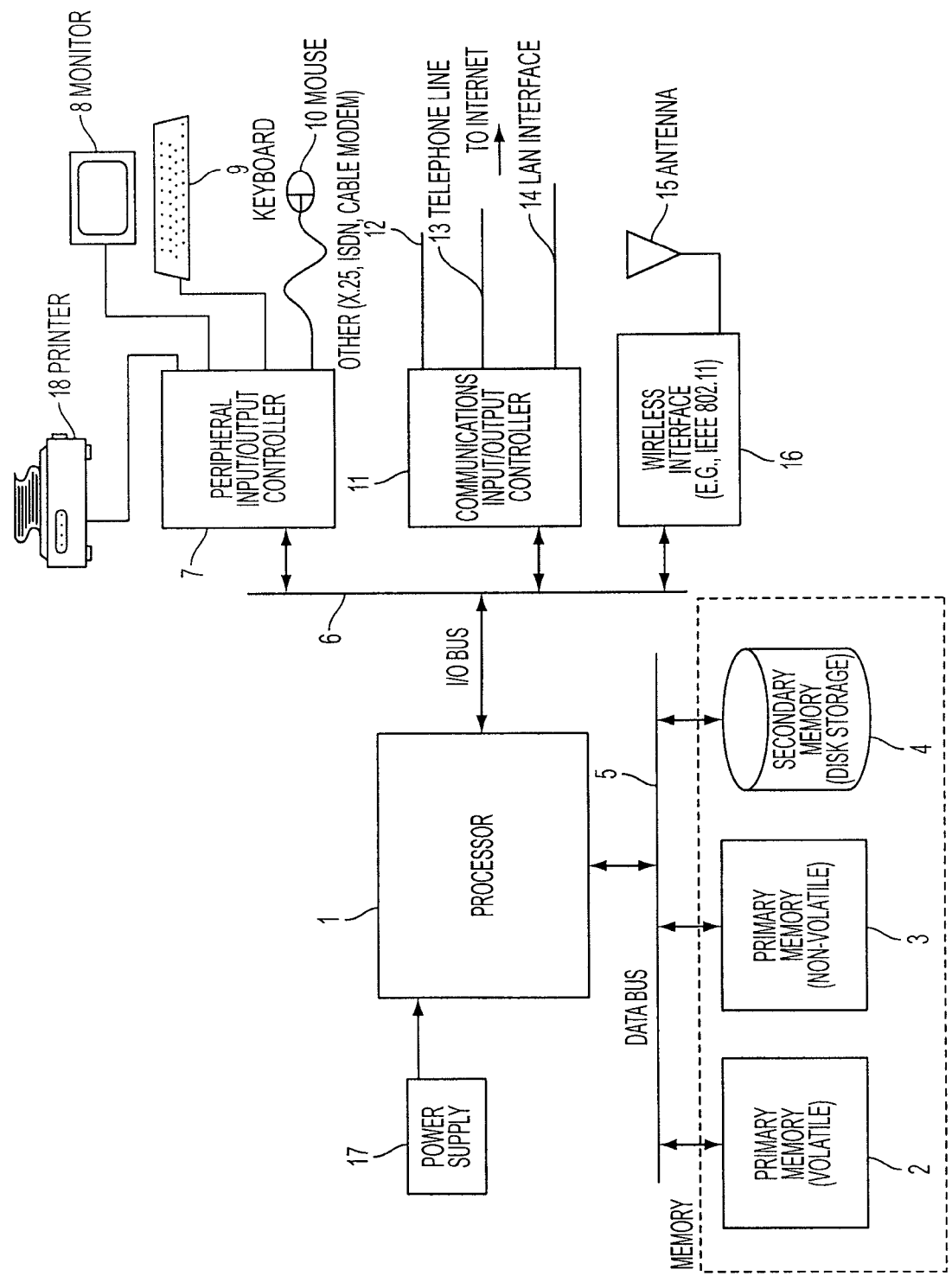
FIG. 1a shows an embodiment of a processing system that can be used to practice aspects of the invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Brief Summary

According to one embodiment, the data collection and evaluation system of the present invention includes an active RFID tag that collects, time-stamps, and stores vehicle sensor data. Examples of the types of data collected include door data indicating whether a door is open or closed, ignition data indicating whether the vehicle is turned on or off, oil pressure data, temperature data, speed data, global positioning data, and diagnostic and trouble code data.

The system further includes an external data acquisition device, such as a mainframe computer system or a hand-held data acquisition device like an iPAQ. The external data acquisition device includes an RFID interrogator that is able to read the RFID tag disposed within the vehicle. The external data acquisition device further includes a processor for analyzing the data and a data radio for transmitting the data transmitted from the RFID tag to another computer.

The ability of the system to collect data with the RFID tag and transmit the data to the external data acquisition device allows for the automation of fleet management processes, vehicle maintenance and repair processes, and certain security features. For example, the vehicle sensor data can be automatically collected and stored for analysis by existing work-study software programs, which perform work time studies on the vehicles and their drivers, including tracking the speed traveled by a vehicle against the global position of the vehicle, time at each stop, time between stops, distance traveled, number of stops per vehicle, and proximity to delivery point. Furthermore, the data can be compared with data ranges indicating normal operating conditions to determine if the vehicle is in need of immediate repair or maintenance. In addition, the RFID tag and the external data acquisition device can be used to automatically perform certain security functions, such as detecting geo-fencing conditions and alerting the hub, nearest facility, or a local computer if the security of the vehicle is breached.

Exemplary System Architecture

As used herein, a computer, or other data acquisition device, may be a device having at least a means for entering information such as a keyboard, touch screen, scanner, etc. and a means for displaying information such as a display, etc. The computer will also be capable of receiving and/or transmitting information. Such information may be transported over a network that may be wired, wireless, optical, or combinations thereof. In one embodiment, the computer may contain a processor and a memory, although in other embodiments the processor and/or memory may reside elsewhere. The computer may be at a fixed location such as a desktop or portable, or it may be a hand-held device such as, for example, a DIAD as is used by UPS.

Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amounts of data. In some embodiments, the disk storage may communicate with the processor using an I/O bus 6 instead or a dedicated bus (not shown). The secondary memory 4 may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

Typically the processor 1 communicates with external communication networks using a communications I/O controller 11, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a local area network (LAN). Any of these interfaces may be used to access the Internet, intranets, LANs, or other data communication facilities.

Finally, the processor 1 may communicate with a wireless interface 16 that is operatively connected to an antenna 15 for communicating wirelessly with other devices, using for example, one of the IEEE 802.11 protocols, 802.15.4 protocol, or standard 3G wireless telecommunications protocols, such as CDMA2000 1x EV-DO, GPRS, W-CDMA, or other protocol.

Figure 1B:
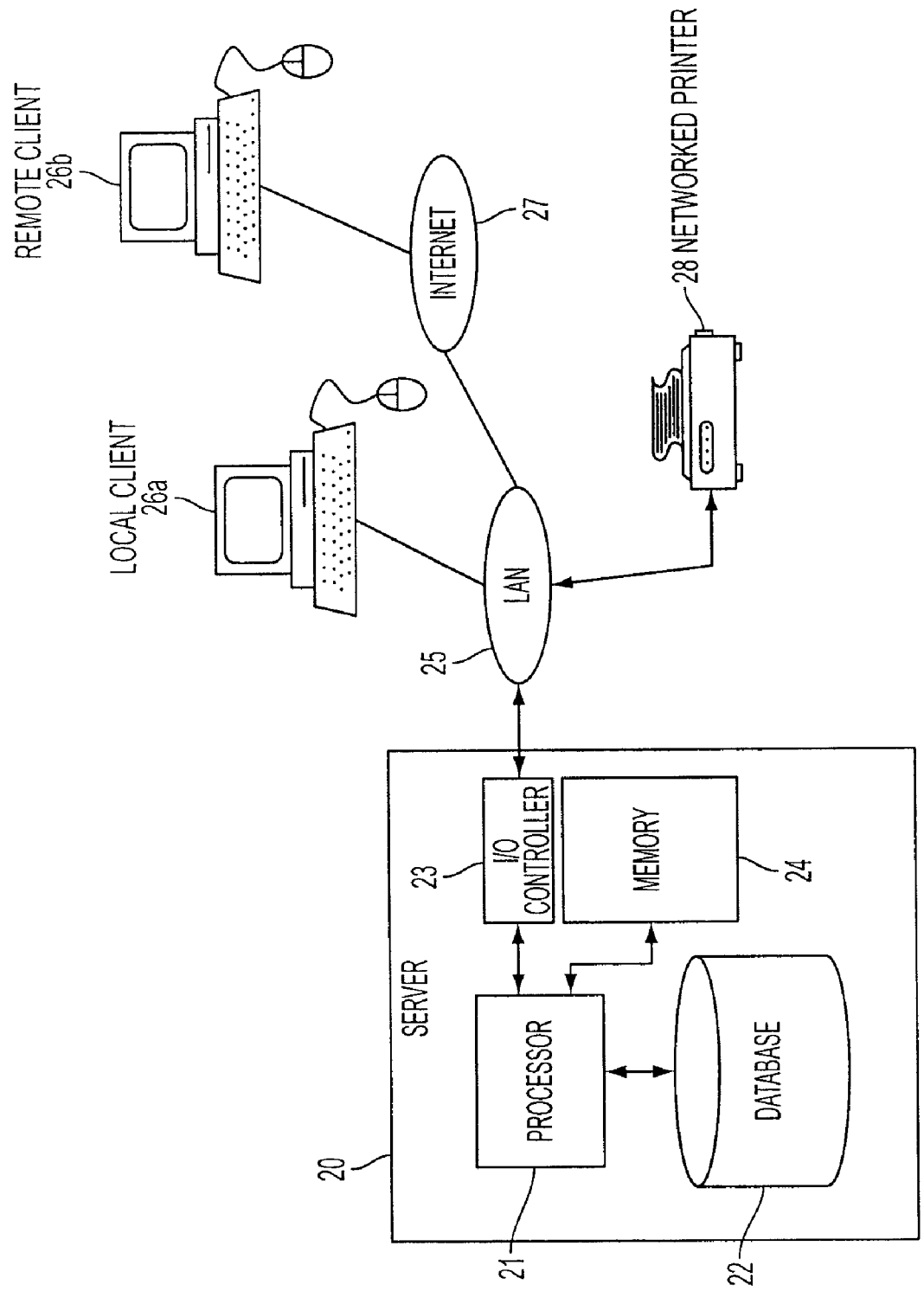
FIG. 1b shows an alternative embodiment of a processing system that can be used to practice aspects of the invention.

An alternative embodiment of a processing system than may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server 20, though not necessarily in the same room. Communication with remote devices typically is accomplished by routing data from the LAN 25 over a communications facility to the Internet 27. A remote client computer 26b may execute a web browser, so that the remote client 26b may interact with the server 20 as required by transmitting data through the Internet 27, over the LAN 25, and to the server 20.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

Figure 2:
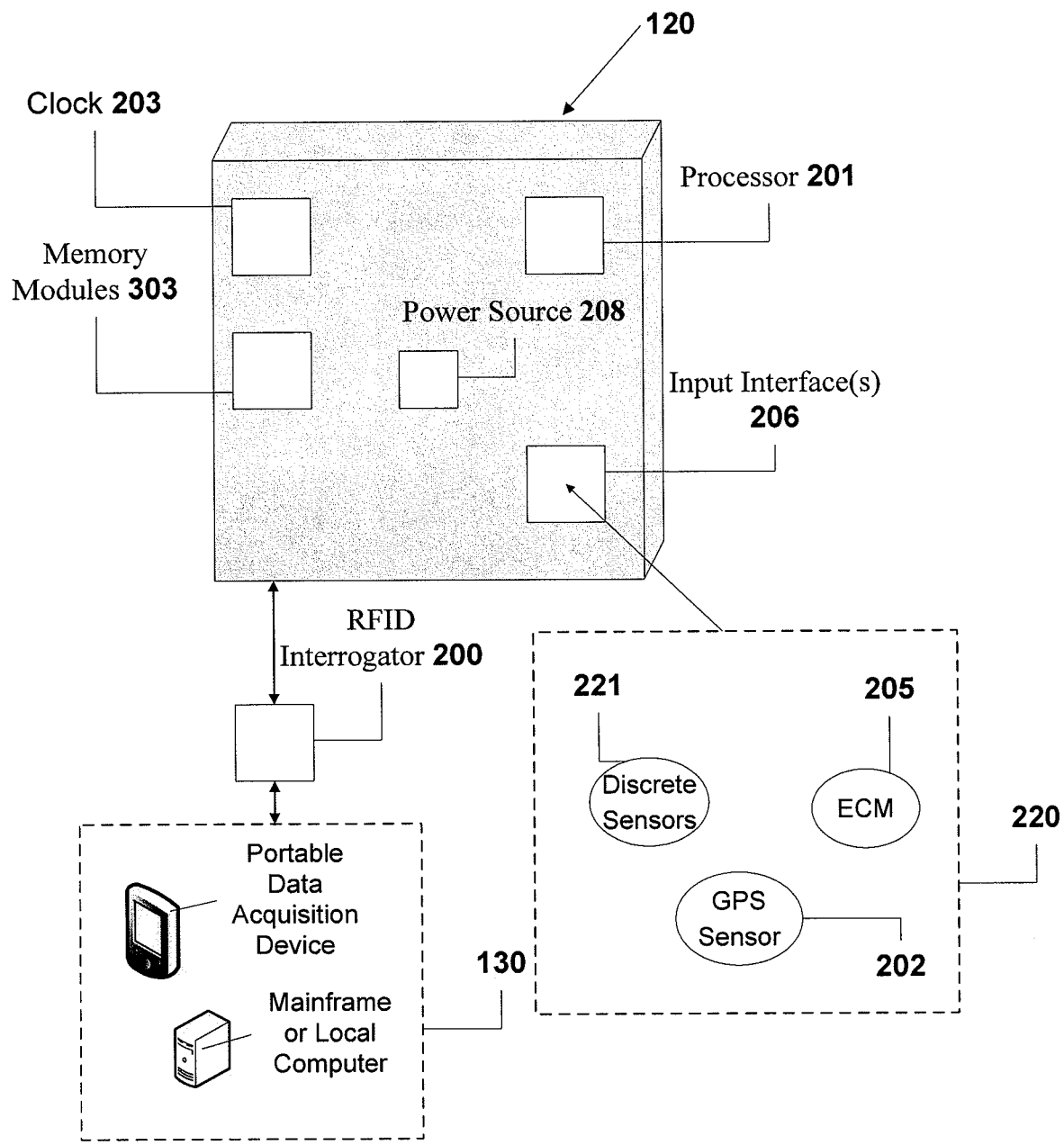
FIG. 2 shows various elements of a system according to one embodiment of the present invention.

FIG. 2 shows various elements of a telematics data collection and evaluation system 100 in accordance with one embodiment of the present invention. As explained in greater detail below, the active RFID tag 120 collects vehicle sensor data and transmits the data to an external data acquisition device 130 via an RFID interrogator 200 in communication with the external data acquisition device 130.

In one embodiment, the active RFID tag 120 includes some or all of the following components: one or more input interfaces 206 for receiving data from vehicle sensors 220, a processor 201 for associating a time with collected vehicle sensor data, a clock 203 that is initialized or synchronized by receiving a radio frequency (RF) signal from an RFID interrogator, memory modules 303, and a power source 208. In addition to discrete sensors 221 disposed within the vehicle, vehicle sensors 220 may be associated with a global positioning system (GPS) sensor 202 and an electronic control module (ECM) 205.

One embodiment of the system utilizes an active RFID tag 120, such as the Identec Solutions AG IQ8V tag. The IQ8V tag operates at 916 Megahertz, is battery powered, and includes a clock for providing a time, a processor that is programmed to associate the time with collected vehicle data, and 8 KB of memory for storing the data and associated times.

In one embodiment, the external data acquisition device 130 includes an RFID interrogator 200 for receiving data from the RFID tag 120, a memory for storing the data received from the RFID tag 120, a processor for analyzing the collected data against other data parameters stored within the memory, and a data radio for communicating over a wireless wide area network (WWAN), wireless local area network (WLAN), a wireless personal area network (WPAN), or any combination thereof.

In one embodiment, a data radio is one of several components available in the external data acquisition device 130. The data radio is configured to communicate with a WWAN, WLAN, or WPAN, or any combination thereof. In one embodiment, a WPAN data radio provides connectivity between the external data acquisition device 130 and peripheral devices, such as another external data acquisition device, a local computer, or a cellular telephone, used in close proximity to the external data acquisition device 130. In one embodiment of the invention, a WPAN, such as, for example, a Bluetooth™ network (IEEE 802.15.1 standard compatible) is used to transfer information between the external data acquisition device 130 and a peripheral device. In other embodiments, WPANs compatible with the IEEE 802 family of standards are used. The IEEE 802 family of standards are hereby incorporated by reference in their entirety and made a part hereof. In one embodiment, the data radio is a Bluetooth™ serial port adapter that communicates wirelessly via WPAN to a Bluetooth™ chipset located in a peripheral device 130. One of ordinary skill in the art will readily recognize that other wireless protocols exist and can be used with the present invention.

In one embodiment of the data collection and evaluation system 100, the external data acquisition device 130 is a portable data acquisition device, such as, for example, the DIAD currently employed by UPS that collects, stores, and transmits package-tracking information. In one embodiment, vehicle performance and tracking data is collected by the RFID tag 120 (called telematics data) and transmitted via an RFID interrogator 200 to the portable data acquisition device, where the data is stored until a communication link is established between the portable data acquisition device and a local computer or a mainframe computer system. In one embodiment, the portable data acquisition device displays telematics data for the driver's viewing, which is helpful in troubleshooting vehicle performance problems and showing delivery route progress and instructions. In an alternative embodiment, the portable data acquisition device is a hand-held data acquisition device, like an iPAQ.

In one embodiment, the portable data acquisition device includes a Bluetooth™ device for transmitting data and communicating via a WPAN to another data acquisition device, such as a mainframe computer system. The portable data acquisition device, in one embodiment, may be programmed to transfer data or communicate with select data acquisition devices. One method of providing the portable data acquisition device with the ability to determine whether it has permission to communicate with a particular data acquisition device is by identifying the data acquisition devices by their media access control (MAC) addresses. The MAC address is a code unique to each Bluetooth™-enabled device that identifies the device, similar to an Internet protocol address identifying a computer in communication with the Internet.

RFID Interrogator

The RFID interrogator 200 transmits an RF signal, which prompts an RFID tag 120 within a pre-defined geographical range of the RFID interrogator 200, or the read range, to collect and store data or upload data from the memory of the tag 120 to the memory of the interrogator 200 or a device in communication with the interrogator 200.

In one embodiment, the RFID interrogator 200 transmits an RF signal continuously and the RFID tag 120 receives the RF signal when the tag 120 is within the read range of the interrogator 200.

In another embodiment, the RFID interrogator 200 transmits an RF signal in response to a signal triggering event. For example, in one embodiment, a signal triggering event includes depressing a button that instructs the interrogator 200 to send an RF signal. In another embodiment, the RF signal could be transmitted "on-demand" if used appropriately with motion sensors, or the like, for recognizing the proximity of vehicles. In yet another embodiment, the RFID interrogator 200 can be programmed to send an RF signal at a particular time interval, such as every five seconds or five minutes. The time intervals can be limited to collecting data at a particular time interval during the course of a route, during a day, or between stops.

According to one embodiment, the RF signal transmitted by the interrogator 200 prompts the initialization of a clock 203 or other timing device associated with the tag 120. In one embodiment, the initialization resets the clock to 00:00. In another embodiment, the initialization synchronizes the clock 203 with an external timing device, such as to the official time in the facility. The RF signal in another embodiment prompts the collection of data sensors within the vehicle through the RFID tag's input interfaces 206. Additionally, in one embodiment, the RF signal prompts the RFID tag 120 to upload data to the RFID interrogator 200 included within an external data acquisition device 130.

Sensors and Data Collected

In one embodiment, the GPS sensor 202 is compatible with a low Earth orbit (LEO) satellite system or a Department of Defense (DOD) satellite system. The GPS sensor 202 is used to receive position, time, and speed data. It will be appreciated by those skilled in the art that more than one GPS sensor 202 may be utilized and other GPS functions may be utilized. The GPS sensor 202, in one embodiment, is disposed within a vehicle and communicates global position data to the active RFID tag 120. In another embodiment, the GPS sensor 202 is disposed within a portable data acquisition device 130 and communicates global position data to the memory of the portable data acquisition device 130.

In one embodiment, the ECM 205 decodes and stores analog and digital inputs and ECM data streams from vehicle systems and sensors, collects and presents the vehicle data to an input interface 206 of the RFID tag 120, and outputs standard vehicle diagnostic codes when received from a vehicle's on-board controllers or sensors. In one embodiment, the ECM 205 communicates to the input interface 206 via J-Bus protocol. Vehicle data received from the ECM 205 can include oil pressure data, temperature data, pedal position, and mileage traveled per hour or per trip. The diagnostic codes can communicate to the tag 120 whether temperatures or fluid levels exceed or drop below a particular level, whether a vehicle system, such as the radiator or the engine, needs servicing, or whether a sensor within the vehicle has stopped working.

In one embodiment, on/off sensors, which register a voltage amount that corresponds with an on/off condition of the sensor, are disposed within the vehicle for collecting data. For example, door sensors that are connected, for example, to the driver side, passenger side, and bulkhead doors, register 0V when in an open position, and 12V when closed. As another example, an ignition sensor registers 0V when the vehicle is off and 12V when the vehicle is turned on.

In one embodiment, variable voltage sensors, which are used to register variations in voltage, are disposed within a vehicle for collecting data. For example, oil pressure sensors detect the oil pressure by registering a particular voltage that corresponds to a particular oil pressure. The voltage of the sensor increases or decreases proportionately with increases or decreases in oil pressure. Other examples of variable voltage sensors include temperature and speed sensors.

RFID interrogators 200 can be located at the gate of a facility, signaling to the RFID tag 120 as the vehicle enters or leaves the facility. In addition, RFID interrogators 200 can be located in an external data acquisition device 130, interrogating the RFID tag 120 when the vehicle is within the read range of the RFID interrogator 200 in the external data acquisition device 130.

Exemplary System Operation

The operation of the data collection and evaluation system 100 is described below in the context of a parcel delivery fleet. However, it should be recognized that one of skill in the art would know how to adapt the system to another type of vehicle fleet, such as train, shipping, and trucking operations.

Figure 3:
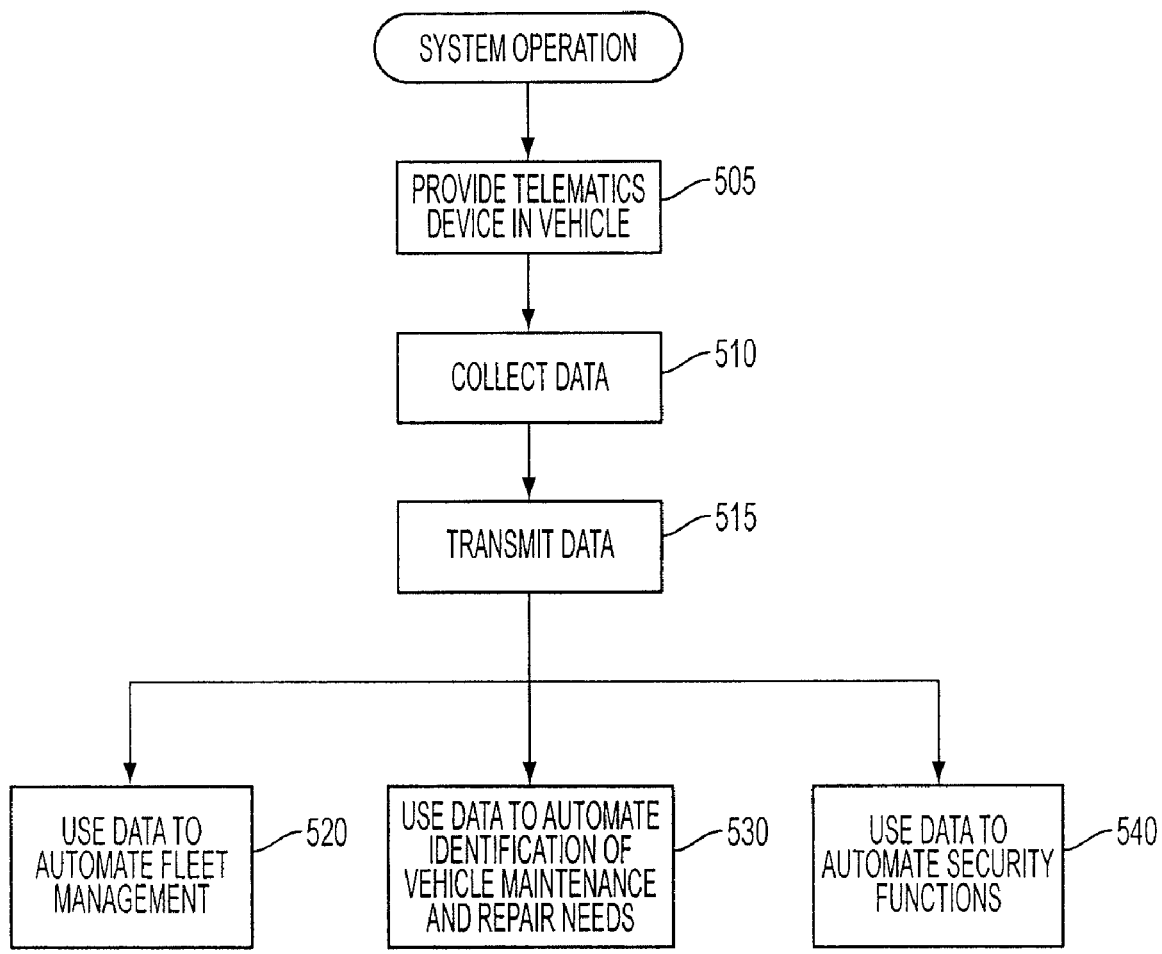
FIG. 3 shows a flowchart of the operation of the system according to one embodiment of the present invention.

FIG. 3 illustrates a flowchart of the operation of the system 100 according to one embodiment of the invention. In Step 505, an active RFID tag 120 is provided within a vehicle 110. In Step 510, the RFID tag 120 collects data from the ECM 205 and other vehicle sensors, including, but not limited to, door sensors, engine sensors, temperature sensors, pressure sensors, and a GPS sensor 202. The processor 201 in the RFID tag 120 associates the data with a time-stamp, which is provided by the clock 203 in the RFID tag 120, and the time-stamped data is stored in a memory 303 in the RFID tag 120.

In one embodiment, the RFID tag 120 collects data in response to a collection triggering event. Examples of triggering events include receiving an RF signal from an RFID interrogator 200, receiving a voltage signal from the ignition sensor that the ignition of the vehicle 110 has been started, receiving sensor information that the vehicle 110 has reached a pre-determined speed, or receiving a manual trigger, such as a signal sent after a button is depressed on the dashboard of the vehicle 110. Collection triggering events can also include time intervals, such as instructions to collect data every five seconds or every five minutes.

Any of the above examples of collection triggering events may be combined to prompt data collection by the RFID tag 120. For example, the RFID tag 120 may be programmed to collect data when the vehicle 110 is started and every five minutes thereafter until the end of the route. As another example, the data collection may be set to occur when the RFID tag 120 receives a manual trigger or when the vehicle 110 reaches a certain speed and every two minutes thereafter until the vehicle 110 is turned off.

As mentioned above, according to one embodiment, the RFID tag 120 is prompted to collect data in response to receiving an RF signal from an RFID interrogator 200. Upon receipt of the signal from an RFID interrogator 200, the RFID tag 120 collects and time-stamps data from the vehicle sensors. In a further embodiment, if the RF signal is the first RF signal received after the engine has been started, the RF signal also prompts the RFID tag 120 to reset the clock 203.

Data from various vehicle sensors 220 is collected via the input interfaces 206 of the RFID tag 120. For example, data collected may include speed, vehicle location, vehicle inertial movement, vehicle door's proximity to another object, mileage, ambient temperature, vehicle weight, data indicating whether a side or back door is in open or closed position, ignition on or off, diagnostic code, or vehicle identity.

Referring back to FIG. 3, in Step 515, the stored time-stamped data is transmitted to an external data acquisition device 130 upon interrogation of the RFID tag 120 by the RFID interrogator 200 located within the external data acquisition device 130. In one embodiment, the external data acquisition device 130 is a portable data acquisition device, such as, for example, an iPAQ or a DIAD. The data transmitted to the portable data acquisition device is later uploaded to a mainframe computer system via a wireless network, an infrared signal, or a wired connection.

In one embodiment, upload triggering events prompt the transmission of data from the RFID tag 120 to the external data acquisition device 130. These upload triggering events can be any of the collection triggering events described above. For example, in a further embodiment, an RFID interrogator 200 is located at the gate of a facility and prompts the RFID tag 120 to upload data upon the vehicle's entry or exit from the facility to a computer or other external data acquisition device located at the facility that is in communication with the RFID interrogator 200. This embodiment streamlines entry and data collection processes by automatically associating the identity of the vehicle 110 transmitted by the RFID tag 120 with the data uploaded from the RFID tag 120.

Other examples of upload triggering events include: a signal via a trigger signal connection from the external data acquisition device 130 to the tag 120, the combination of a signal from the external data acquisition device 130 and data from the ignition sensor indicating that the ignition of the vehicle 110 has been started, the combination of a signal from the external data acquisition device 130 and data indicating that the vehicle 110 has reached a pre-determined speed, and a signal from an RFID interrogator 200.

Finally, referring back to FIG. 3, the data can be used by an external data acquisition device 130 to automate certain fleet management functions, as shown in Step 520, automate the identification and notification processes of vehicle maintenance and repair needs, as shown in Step 525, and automate security functions, as shown in Step 530. Each of these functions is discussed in more detail below.

The following sections provide examples of how the system 100 provides for the more efficient management of fleet operations and vehicle maintenance and repair needs and implementation of security features to protect vehicles and vehicle operators.

Fleet Management and Work Studies of the Delivery Process

The data collected by the system 100 is used to perform work studies on fleet operation processes, such as the delivery process and the pickup process. By automatically collecting, time-stamping, and transmitting the data to a mainframe computer system, work element measurement activity is significantly reduced and possibly eliminated. Furthermore, the data collected can be used to track the delivery and pick-up processes and identify steps that can be performed more efficiently. Other functions include the ability to customize asset management, inventory tracking, and security applications with respect to the territory being dispatched.

The GPS sensor 202 provides data indicating the current geographical position of the vehicle 110. This data is used, for example, to provide real-time vehicle tracking and real-time polling of the vehicle 110. In addition, having the current geographical position of the vehicle 110 allows fleet operators to automate geo-fencing functions for the fleet and determine when and how often a vehicle 100 travels outside of the geo-fenced area. "Geo-fencing" refers to setting geographical position parameters that define a geographical area and tracking a vehicle to determine if it travels in or out of the defined geographical area. In one embodiment, the portable data acquisition device 130 communicates an alarm or other signal when the vehicle 110 moves outside the defined geographical area, as indicated by the data collected by the RFID tag 120 and transmitted to the portable data acquisition device 130 via the RFID interrogator 200. In another embodiment, the portable data acquisition device 130 communicates an alarm or other signal when the vehicle 110 moves inside the geographical area.

In one embodiment, an RFID interrogator 200 in communication with a portable data acquisition device 130 receives the data from the RFID tag 120, and the processor of the portable data acquisition device 130 compares upcoming delivery points with the current global position indicated by the GPS data and communicates to the driver the vehicle's proximity to upcoming stops. This reduces walk time associated with park position error and possibly eliminates mis-delivery claims and associated driver follow-ups. Mis-delivery claims arise when parcels are delivered to the wrong address. By comparing current vehicle position with the delivery data associated with the parcel, the portable data acquisition device 130 detects potential mis-deliveries in real-time and notifies the operator before the vehicle 110 leaves the delivery location.

In one embodiment, real time position, downloaded dispatch, and real time travel conditions are analyzed to determine an estimated time of arrival for delivery and pick-up services. The real time estimation can be provided to customers or used to assist fleet managers in determining whether to dispatch additional vehicles to a particular area when delays are expected. In one embodiment, the estimated time of arrival (ETA) is communicated to computers located at upcoming delivery points via a wireless data network, the Internet, or other network to inform customers of the ETA. In another embodiment, if a customer wants to receive a particular parcel earlier than the ETA predicted for the customer's delivery location, the customer can identify another delivery location that has an earlier ETA and arrange to meet the vehicle at the other delivery location at the ETA to pick up the parcel early.

Fleet managers can also use collected GPS data to track when GPS signals are lost and forecast when and where the GPS signal may be lost in the future. In one embodiment, the RFID tag 120 collects GPS sensor 202 data and inertia sensor data. The data collected from the inertia sensor, in combination with a time-stamp, allows the external data acquisition device 130 that receives the data from the RFID interrogator 200 to estimate the movement of the vehicle 110 while the GPS sensor 202 was unable to receive a signal, which assists in automating the geo-fencing function, defining the areas in which GPS signals were lost, and continuing to provide the functions described above that use the global positioning data. In another embodiment, the external data acquisition device 130 integrates the GPS and/or inertial sensor data with device (DIAD) based dead reckoning to automatically determine vehicle position and delivery point position.

In addition, the RFID tag 120 can be used to locate a particular vehicle 110 in a hub facility yard. In one embodiment, RFID interrogators 200 are positioned at fixed locations within a hub facility yard. An interrogator 200 receives a signal from the RFID tag 120 when the vehicle 110 is within an interrogator's read zone. By identifying the location of the RFID interrogator 200 that captured the RFID tag 120 for the vehicle 110, the vehicle's approximate position in the yard can be determined.

In one embodiment, the RFID tag 120 receives data from a proximity sensor positioned on the back of the vehicle. This sensor is used to detect the vehicle's proximity to another object. The RFID tag 120 transmits the data indicating the proximity to an RFID interrogator 200 in communication with a portable data acquisition device 130, and the portable data acquisition device 130 is configured to notify the driver when the vehicle is within a certain distance of another object. This provides an added safety feature for the vehicle 110 and the object behind it and reduces the amount of time the driver spends estimating the vehicle's proximity to objects behind it.

In one embodiment, the RFID tag 120 communicates with a facility to notify the facility of the vehicle's arrival or departure. An RFID interrogator 200 is positioned at the gate of the facility, and when the vehicle 110 passes by the interrogator 200, the RFID tag 120 sends a signal to the RFID interrogator 200 identifying the vehicle 110. In a further embodiment, portions of the cargo within the vehicle 110 may include RFID tags, and these tags also communicate their identity to the RFID interrogator 200, which allows the mainframe computer system at the facility to associate the cargo with the vehicle 110 and further automates the process of tracking cargo. In another embodiment, the portable data acquisition device 130 contains an RFID interrogator 200 and receives signals from RFID tags located on cargo within the vehicle 110. The portable data acquisition device 130 can communicate the identity of the cargo located on the vehicle 110 to the facility's mainframe computer system via a wireless network while the vehicle is traveling along its route.

The RFID tag 120 can also be utilized to streamline the scale process, for example, by identifying the vehicle being weighed to an RFID interrogator 200 at the facility or the scale facility. Additionally, the RFID tag 120 can be used to streamline the trailer/dolly number entry process, for example, by identifying the vehicle 110 entering or leaving a facility, and in one embodiment, uploading data stored in the RFID tag 120 to an RFID interrogator 200 in communication with a local or mainframe computer system upon entering or leaving a facility via a WLAN or a WPAN.

Knowing the location of a vehicle 110, such as by its global position using a GPS sensor 202 or by an RFID interrogator's position in a yard of a facility, and the cargo it contains allows fleet operators to forecast trailer on flatcar (TOFC) and container on flatcar (COFC) arrivals and departures and traffic density in facilities, rail yards, and ports. In addition, the facility or a customer can better estimate the arrival time of a vehicle 110. Thus the facility can direct vehicles to a certain area of the facility or have certain equipment ready to handle the incoming vehicles. Facilities may include a parcel sorting facility, a rail yard facility, or a seaport facility, for example.

According to one embodiment of the system 100, the portable data acquisition device 130 communicates via a WPAN or a WLAN with local computers. This ability allows local computers located at delivery and pickup locations to notify the vehicle operator as to whether the vehicle 110 needs to stop, preventing unnecessary stops and ensuring that stops are not accidentally skipped. In addition, in one embodiment, the portable data acquisition device includes delivery data for each customer, and this customer-specific data can be transmitted to the local computer of a customer before the vehicle arrives at the customer's location, allowing the customer to prepare for cash-on-delivery (COD) payments or mobilize personnel or equipment to handle the incoming delivery or pick-up load. In another embodiment, the hub facility can send messages for a particular operator to a computer located at a future delivery location, such as over the Internet or other network. When the particular operator arrives at the customer's location, the computer, which is in communication with a WPAN, communicates the message to the operator's portable data acquisition device 130 via the WPAN. In one embodiment, the message is tagged to only transmit to the particular MAC address identifying the operator's portable data acquisition device 130.

Vehicle Maintenance and Repair

The data collected from vehicle sensors by the RFID tag 120 can also be used to automate the notification and diagnosis of vehicle maintenance and repair needs. For example, in one embodiment, the data collected by the RFID tag 120 is transmitted to an RFID interrogator 200 in communication with an external data acquisition device 130, and the data is compared with a range of values stored in the external data acquisition device 130. The range of values indicates normal vehicle operating conditions. If the data value falls outside of the range, the external data acquisition device 130 sends an alert signal or a message indicating the abnormal condition to the driver or maintenance and repair personnel. The alert signal or message may include, for example, a fault code, diagnostic code, or maintenance schedule request. In another embodiment, the external data acquisition device is a portable data acquisition device 130, and the portable data acquisition device can page a remote external data acquisition device upon detection of an abnormal condition.

In one embodiment, data indicating the tire pressure of each tire of a vehicle can be analyzed over a particular time periods, such as, for example, a week. A faster than normal decrease in the tire pressure of one or more tires can alert maintenance personnel to a potential tire problem. In another embodiment, the data can also be used to identify driver errors that can cause harm to the vehicle. For example, the data collected can include pedal position and revolutions per minute of the engine at a particular point in time. Maintenance personnel can use the data to identify whether the operator has been starting the vehicle is second gear, which can reduce the life of a clutch in the vehicle.

As discussed above, the portable data acquisition device 130 can communicate with hub facilities via a wireless wide area network. Thus, the portable data acquisition device 130 can receive instructions from the facility that assist the vehicle operator in making repairs while the vehicle is traveling on its route. In addition, the ability to communicate with the hub allows the portable data acquisition device 130 to communicate vehicle data and problems in real time, which results in the earlier detection of problems. This can prevent problems from becoming more advanced and potentially causing further injury to the vehicle or the operator.

Automating Security Features

In addition to using the collected data to improve the efficiency of various elements of the delivery process and detect vehicle maintenance and repair needs, the RFID tag 120 can collect data that can be used to automate the detection of certain security triggering events. The data is transmitted to an RFID interrogator 200 in communication with an external data acquisition device 130, and the data is compared to security triggering event parameters by the external data acquisition device 130. In response to the data matching the parameters, the external data acquisition device 130 may, for example, send a signal to the facility indicating that a security triggering event has been detected.

In one embodiment, a security triggering event is detected when the data collected by the RFID tag 120 indicates that the vehicle 110 has traveled outside of the geo-fencing parameters. A portable data acquisition device 130 sends an alarm to the facility to provide the facility with advance notice of potential misuse or theft of the vehicle 110. Furthermore, the ability of the RFID tag 120 to collect data that tracks the location of the vehicle 110 using the GPS sensor 202, inertia sensor, or dead reckoning ability, and the tag's 120 ability to transmit the data to an RFID interrogator 200 in communication with an external data acquisition device 130, which can transmit the data to a facility mainframe computer system via a wireless network, allows the facility or emergency personnel to send assistance to the vehicle 110 if the security of the vehicle 110 is breached or the vehicle 110 is stolen. In a further embodiment, the portable data acquisition device 130 detects a security triggering event if the vehicle is outside of geo-fencing parameters for more than a particular time period, for example, fifteen minutes.

In another embodiment, the door data is compared with engine data and speed data by a portable data acquisition device. If the door data indicates a door is in an open position, the engine data indicates that the engine is running, and the speed data indicates that the vehicle is not moving, a security triggering event is detected and an alarm signal is sent to the vehicle operator or to the facility, or both, from the portable data acquisition device 130.

In another embodiment, the RFID tag 120 identifies the vehicle upon arrival or departure to a facility's gate-mounted RFID interrogator 200. Having the ability to automatically identify vehicles approaching a gate allows for the automatic process of granting permission to enter or exit a facility. In one embodiment, the gate of a facility is programmed to open or close depending on receipt of permission to enter or exit.

Embodiments of the system described above provide an efficient data collection system for fleet management personnel, which in turn provides a more efficient approach to performing work studies on fleet operation processes. Work element measurement activity is significantly reduced and possibly eliminated by automatically collecting and analyzing the combination of known delivery point, synchronized "atomic" time, and automotive engine data. The ability to display upcoming delivery point proximity to current position reduces selection time associated with memorizing the next five stops. The ability to display upcoming delivery point proximity to the current global position of the vehicle assists the driver with deciding where to park the vehicle. Misdelivery claims and associated driver follow-ups are also reduced and possibly eliminated by having the ability to compare a delivery point's proximity with the current global position of the vehicle. Dynamic dispatch of new time-definite delivery and pickup services are enabled by analyzing current global position and downloaded dispatch. Asset management, inventory tracking, and security applications can be customized with respect to the territory being dispatched. A GPS and telematics-enabled DIAD makes it possible for one device to serve both feeder and package networks, and it enables a "whole" network view that standardizes service offerings. Vehicle based positioning integrated with device (DIAD) based dead reckoning allows for automatic determination of vehicle position and delivery point position. Finally, because this comprehensive telematics system is adaptable in all vehicles within the fleet, it is more efficiently installed, maintained, and improved upon.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for automating the collection of vehicle sensor data for fleet operations of a parcel delivery service, said system comprising:
    an active RFID tag comprising an input interface for collecting data from one or more sensors disposed within a vehicle, a processor for associating a time-stamp with at least a portion of said data, and a first memory for storing said time-stamped data, wherein said data includes a current global position of said vehicle; and
    a portable data acquisition device accessible to a vehicle operator, said portable data acquisition device comprising an RFID interrogator for receiving said data from said first memory, a second memory for storing said data, and a data acquisition processor,
    wherein said second memory is further configured for storing one or more pre-selected delivery positions and said portable data acquisition device is configured to compare said current global position to said one or more pre-selected delivery positions and execute one or more steps selected from a group consisting of: (a) alerting said operator of a nearest of said delivery positions to said current global position; and (b) providing an estimated time of arrival to each of said one or more pre-selected delivery positions to said operator.

2. The system of claim 1, wherein said portable data acquisition device is configured to alert said operator of a nearest of said delivery positions to said current global position.

3. The system of claim 2, wherein said portable data acquisition device is further configured to:
    compare a delivery point of a parcel to said current global position; and
    alert said operator in response to determining, based a comparison of said delivery point to said current global position, that said parcel is being delivered to an incorrect delivery position.

4. The system of claim 1, wherein said portable data acquisition device is configured to provide an estimated time of arrival of a parcel at each of said one or more pre-selected delivery positions to said operator.

5. The system of claim 4, wherein said portable data acquisition device is further configured to alert said operator of a nearest of said delivery positions to said current global position.

6. The system of claim 4, wherein said portable data acquisition device is further configured to receive a change of delivery location in response to providing said estimated time of arrival at said one or more pre-selected delivery positions.

7. The system of claim 4, wherein said alert comprises displaying a message via said portable data acquisition device viewable by said operator.

8. A system for automating the collection of vehicle sensor data for fleet operations of a parcel delivery service, said system comprising:
    an active RFID tag comprising an input interface for collecting data from one or more sensors disposed within a vehicle, a processor for associating a time-stamp with at least a portion of said data, and a first memory for storing said time-stamped data, wherein said data includes a current global position of said vehicle; and
    a portable data acquisition device accessible to a vehicle operator, said portable data acquisition device comprising an RFID interrogator for receiving said data from said first memory, a second memory for storing said data, and a data acquisition processor, wherein:
        said second memory is further configured for storing one or more pre-selected delivery positions, and
        said portable data acquisition device is configured to (a) compare said current global position to said one or more pre-selected delivery positions and (b) use said current global position to determine if said vehicle has traveled outside a first geographic area.

9. The system of claim 8, wherein said portable data acquisition device is configured to use said current global position to determine whether said vehicle has traveled inside said first geographic area.

10. A system for automating a collection of vehicle sensor data for fleet operations of a parcel delivery service, said system comprising:
    an active RFID tag comprising:
        (A) an input interface for collecting data from one or more sensors disposed within a vehicle in response to a collection triggering event,
        (B) a processor for associating a time-stamp with at least a portion of said data, and
        (C) a first memory for storing said time-stamped data, wherein said data includes a current global position of said vehicle; and
    a portable data acquisition device accessible to a vehicle operator, said portable data acquisition device comprising:
        (A) an RFID interrogator for receiving said data from said first memory,
        (B) a second memory for storing said data, and
        (C) a data acquisition processor,
    wherein said second memory is further configured for storing one or more pre-selected delivery positions and said portable data acquisition device is configured to compare said current global position to said one or more pre-selected delivery positions.

11. The system of claim 10, wherein said collection triggering event comprises receiving a voltage signal from an ignition sensor indicating that an engine of the vehicle has been started.

12. The system of claim 10, wherein said collection triggering event comprises receiving a voltage signal from a speed sensor that a predetermined speed has been reached.

13. A system for automating the collection of vehicle sensor data for fleet operations of a parcel delivery service, said system comprising:
    an active RFID tag comprising an input interface for collecting data from one or more sensors disposed within a vehicle wherein the data the RFID tag collects comprises data selected from a group consisting of: (a) one or more diagnostic codes, (b) door data, and (c) ignition data, a processor for associating a time-stamp with at least a portion of said data, and a first memory for storing said time-stamped data, wherein said data includes a current global position of said vehicle; and a portable data acquisition device accessible to a vehicle operator, said portable data acquisition device comprising an RFID interrogator for receiving said data from said first memory, a second memory for storing said data, and a data acquisition processor, wherein said second memory is further configured for storing one or more pre-selected delivery positions and said portable data acquisition device is configured to compare said current global position to said one or more pre-selected delivery positions.

14. The system of claim 13, wherein the one or more diagnostic codes indicate that a particular engine fluid is above a particular fluid level threshold.

15. The system of claim 13, wherein the one or more diagnostic codes indicate that a particular engine fluid is below a particular fluid level threshold.

16. The system of claim 13, wherein the one or more diagnostic codes indicate that an engine pressure exceeds a particular pressure level threshold.

17. The system of claim 13, wherein the one or more diagnostic codes indicate that an engine pressure is below a particular pressure level threshold.

18. The system of claim 13, wherein the data collected by the RFID tag comprises door data indicating that a particular door is in an open position.

19. The system of claim 13, wherein the data collected by the RFID tag comprises door data indicating that a particular door is in a closed position.

20. The system of claim 13, wherein the data collected by the RFID tag comprises ignition data from an engine of the vehicle, wherein the ignition data indicates whether the engine is turned on.

21. A fleet management system for automating the collection of vehicle sensor data for fleet operations of a parcel delivery service, said system comprising:
an active RFID tag comprising:
(A) an input interface for collecting data from one or more sensors that are disposed within a vehicle, wherein the data includes data selected from a group consisting of: (1) one or more diagnostic codes, (2) door data, and (3) ignition data,
(B) a processor for associating a time-stamp with at least a portion of said data, and
(C) a first memory for storing said data; and
a portable data acquisition device accessible to a vehicle operator, said portable data acquisition device comprising:
an RFID interrogator for receiving said data from said first memory,
a second memory for storing said data, a data acquisition processor, and
a data radio for wirelessly communicating with a facility,
wherein said second memory stores data parameters representative of normal vehicle operation conditions, and said portable data acquisition device is configured for comparing said data collected by said RFID tag to said data parameters in said second memory and transmitting an alarm signal if said collected data is outside of said data parameters.

22. The fleet management system of claim 21, wherein the one or more diagnostic codes are output by an electronic control module.

23. The fleet management system of claim 21, wherein the one or more diagnostic codes indicate that a particular engine fluid is above a particular fluid level threshold.

24. The fleet management system of claim 21, wherein the one or more diagnostic codes indicate that a particular engine fluid is below a particular fluid level threshold.

25. The fleet management system of claim 21, wherein the one or more diagnostic codes indicate that an engine pressure exceeds a particular pressure level threshold.

26. The fleet management system of claim 21, wherein the one or more diagnostic codes indicate that an engine pressure is below a particular pressure level threshold.

27. The fleet management system of claim 21, wherein the data collected by the RFID tag comprises door data indicating that a particular door is in an open position.

28. The fleet management system of claim 21, wherein the data collected by the RFID tag comprises door data indicating that a particular door is in a closed position.

29. The fleet management system of claim 21, wherein the data collected by the RFID tag comprises ignition data from an engine of the vehicle that indicates whether the engine is turned on.

30. A fleet management system for automating the collection of vehicle sensor data for fleet operations of a parcel delivery service, said system comprising:
an active RFID tag comprising:
an input interface for collecting data from one or more sensors that are disposed within a vehicle, and
a processor for associating a time-stamp with at least a portion of said data, and
a first memory for storing said data; and
a portable data acquisition device accessible to a vehicle operator, said portable data acquisition device comprising:
an RFID interrogator for receiving said data from said first memory,
a second memory for storing said data, a data acquisition processor, and
a data radio for wirelessly communicating with a facility,
wherein said second memory stores data parameters representative of normal vehicle operation conditions, and said portable data acquisition device is configured for (a) comparing said data collected by said RFID tag to said data parameters in said second memory, (b) comparing said collected data to said data parameters in said second memory over a time interval, and (c) transmitting an alarm signal if said collected data is outside of said data parameters.

31. The fleet management system of claim 30 wherein said portable data acquisition device is configured for identifying an abnormal decrease in tire pressure over the time interval.

32. The fleet management system of claim 31 wherein said portable data acquisition device is configured for generating a scheduling request to maintenance personnel in response to the abnormal decrease in tire pressure over the time interval.

33. The fleet management system of claim 30 wherein said RFID tag collects data in response to a collection triggering event.

34. The fleet management system of claim 33 wherein said collection triggering event comprises receiving a voltage signal from an ignition sensor indicating that an engine of the vehicle has been started.

35. The fleet management system of claim 33 wherein said collection triggering event comprises receiving a voltage signal from a speed sensor that a predetermined speed has been reached.

* * * * *